United States Patent
Rajagopalan et al.

(10) Patent No.: US 11,423,468 B2
(45) Date of Patent: Aug. 23, 2022

(54) INTELLIGENT COSOURCING IN AN E-PROCUREMENT SYSTEM

(71) Applicant: SAP SE, Walldorf (DE)

(72) Inventors: Nithya Rajagopalan, Bengaluru (IN); Vidhya Neelakantan, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/943,304

(22) Filed: Jul. 30, 2020

(65) Prior Publication Data

US 2022/0036436 A1 Feb. 3, 2022

(51) Int. Cl.
    *G06Q 30/00* (2012.01)
    *G06Q 30/06* (2012.01)
    *G06N 20/00* (2019.01)
    *H04L 67/1074* (2022.01)

(52) U.S. Cl.
    CPC ......... *G06Q 30/0637* (2013.01); *G06N 20/00* (2019.01); *G06Q 30/0611* (2013.01); *G06Q 30/0619* (2013.01); *H04L 67/1078* (2013.01)

(58) Field of Classification Search
    None
    See application file for complete search history.

(56) References Cited

U.S. PATENT DOCUMENTS

| | | | | |
|---|---|---|---|---|
| 5,758,328 | A | * | 5/1998 | Giovannoli ............ G06Q 30/06 705/26.4 |
| 2018/0039936 | A1 | * | 2/2018 | Klechner .............. G06Q 20/203 |
| 2019/0180358 | A1 | * | 6/2019 | Nandan ................ G06K 9/6269 |
| 2020/0279219 | A1 | * | 9/2020 | Desai .................... G06N 20/20 |
| 2021/0081895 | A1 | * | 3/2021 | Raghu .................. G06Q 10/105 |
| 2021/0158236 | A1 | * | 5/2021 | Bikumala ............ G06K 9/6278 |
| 2021/0201247 | A1 | * | 7/2021 | Shelke .................... G06F 40/30 |

OTHER PUBLICATIONS

"Artificial Intelligence and Its Impacton Procurement and Supply Chain" Copyright © 2018 GEP. Retrieved from https://sig.org/system/tdf/srcDocs/Artificial_Intelligence_and_Its_Impact_on_Procurement_and_Supply_Chain_White_Paper_2019.pdf?file=1&type=node&id=14913& (Year: 2018).*

* cited by examiner

*Primary Examiner* — Naeem U Haq
(74) *Attorney, Agent, or Firm* — Mintz Levin Cohn Ferris Glovsky and Popeo, P.C.

(57) ABSTRACT

Aspects of the current subject matter are directed to implementing a distribution scenario in a system. In particular, implementations of the current subject matter provide for a designating client device to create a group of distributing client devices for events among and with a plurality of second client devices. Implementations of the current subject matter further relate to automatic assignment of items among the group of distributing client devices, the assignment based on designating client device-established constraints, and to providing an aggregate view of information related to the automatic assignment of the items to allow the designating client device to manage the items.

17 Claims, 5 Drawing Sheets

200

Project Group Details

Define this Group by entering a group Title. By changing which Roles are included in this group, you can change Title: * EditOnly Members: (no value)

Roles: Sourcing Content Editor [ select ]

Project: Test project ⓘ

Edit Section

Use sections to organize your content. They are similar to folders or directories.

3 - Pricing

Name:* [Pricing] Translations

Description: [ B I U — size — — font — ]

Translations

Visible to Participant: [Yes ▼] ⓘ
Team Access Control: [(no value) ▼] View Details ⓘ
Additional Editor Groups: [EditOnly (Test project) ▼] Add more ⓘ
SM KPI Name: [(no value) ▼]
Visibility Conditions: (none) ▼ ⓘ

FIG. 3

INTELLIGENT COSOURCING IN AN E-PROCUREMENT SYSTEM

BACKGROUND

In an electronic procurement system, client devices are connected to facilitate and conduct transactions, including authorizations and purchases of products, items, and services. An electronic procurement system may connect the client devices for sourcing of products, items, and services. An electronic procurement system may implement bidding and auctioning processes and may establish contracts between the client devices. In some instances, there may be a need to efficiently and effectively distribute sourcing tasks among client devices.

SUMMARY

Methods, systems, and articles of manufacture, including computer program products, are provided for implementing distributed sourcing in an electronic procurement ("e-procurement") system.

According to an aspect of the current subject matter, a system is provided. The system includes at least one data processor, and at least one memory storing instructions which, when executed by the at least one data processor, result in operations including: receiving, from a designating client device, event creation data, the event creation data defining a plurality of items, a plurality of distributing client devices, and one or more constraints related to an association between a plurality of second client devices and the plurality of items; determining, based on the one or more constraints and utilizing a trained machine learning model, an assignment of a first item of the plurality of items to a first distributing client device of the plurality of distributing client devices; sending, to the first distributing client device and in response to determining the assignment, a request to obtain the first item; receiving, from the first distributing client device and in response to the request, data related to a subset of the plurality of second client devices, the subset of the plurality of second client devices associated with the first distributing client device and the first item; and generating, on a display at the designating client device, a user interface including the data related to the subset of the plurality of second client devices.

According to an inter-related aspect, a computer-implemented method includes: receiving, from a designating client device, event creation data, the event creation data defining a plurality of items, a plurality of distributing client devices, and one or more constraints related to an association between a plurality of second client devices and the plurality of items; determining, based on the one or more constraints and utilizing a trained machine learning model, an assignment of a first item of the plurality of items to a first distributing client device of the plurality of distributing client devices; sending, to the first distributing client device and in response to determining the assignment, a request to obtain the first item; receiving, from the first distributing client device and in response to the request, data related to a subset of the plurality of second client devices, the subset of the plurality of second client devices associated with the first distributing client device and the first item; and generating, on a display at the designating client device, a user interface including the data related to the subset of the plurality of second client devices.

According to an inter-related aspect, a non-transitory computer-readable storage medium is provided, the non-transitory computer readable medium including program code, which when executed by at least one data processor, result in operations including: receiving, from a designating client device, event creation data, the event creation data defining a plurality of items, a plurality of distributing client devices, and one or more constraints related to an association between a plurality of second client devices and the plurality of items; determining, based on the one or more constraints and utilizing a trained machine learning model, an assignment of a first item of the plurality of items to a first distributing client device of the plurality of distributing client devices; sending, to the first distributing client device and in response to determining the assignment, a request to obtain the first item; receiving, from the first distributing client device and in response to the request, data related to a subset of the plurality of second client devices, the subset of the plurality of second client devices associated with the first distributing client device and the first item; and generating, on a display at the designating client device, a user interface including the data related to the subset of the plurality of second client devices.

In some variations, one or more of the features disclosed herein including the following features can optionally be included in any feasible combination. The determining may be further based on one or more properties associated with the plurality of distributing client devices. The one or more constraints related to procurement may include use of a previously-used second client device from the plurality of second client devices, where the trained machine learning model predicts likelihood of the plurality of distributing client devices being associated with one or more previously awarded second client devices of the plurality of second client devices. The trained machine learning model may include a classification algorithm, where input features to the classification algorithm may include a distributing client device identifier, a second client device identifier, a bid identifier, and/or an item identifier. A second assignment of the first item of the plurality of items to a second distributing client device of the plurality of distributing client devices may be determined, the determination based on the one or more constraints and utilizing a trained machine learning model; the user interface may include second data related to a second subset of the plurality of second client devices, the second subset of the plurality of second client devices associated with the second distributing client device and the first item. Data related to the plurality of items may be aggregated on the user interface. An application programming interface configured to allow the designating client device to input the event creation data may be provided.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is a representation of a graphical user interface for defining a group consistent with implementations of the current subject matter;

FIG. 3 is a representation of a graphical user interface for editing a transaction consistent with implementations of the current subject matter;

Figure 1:
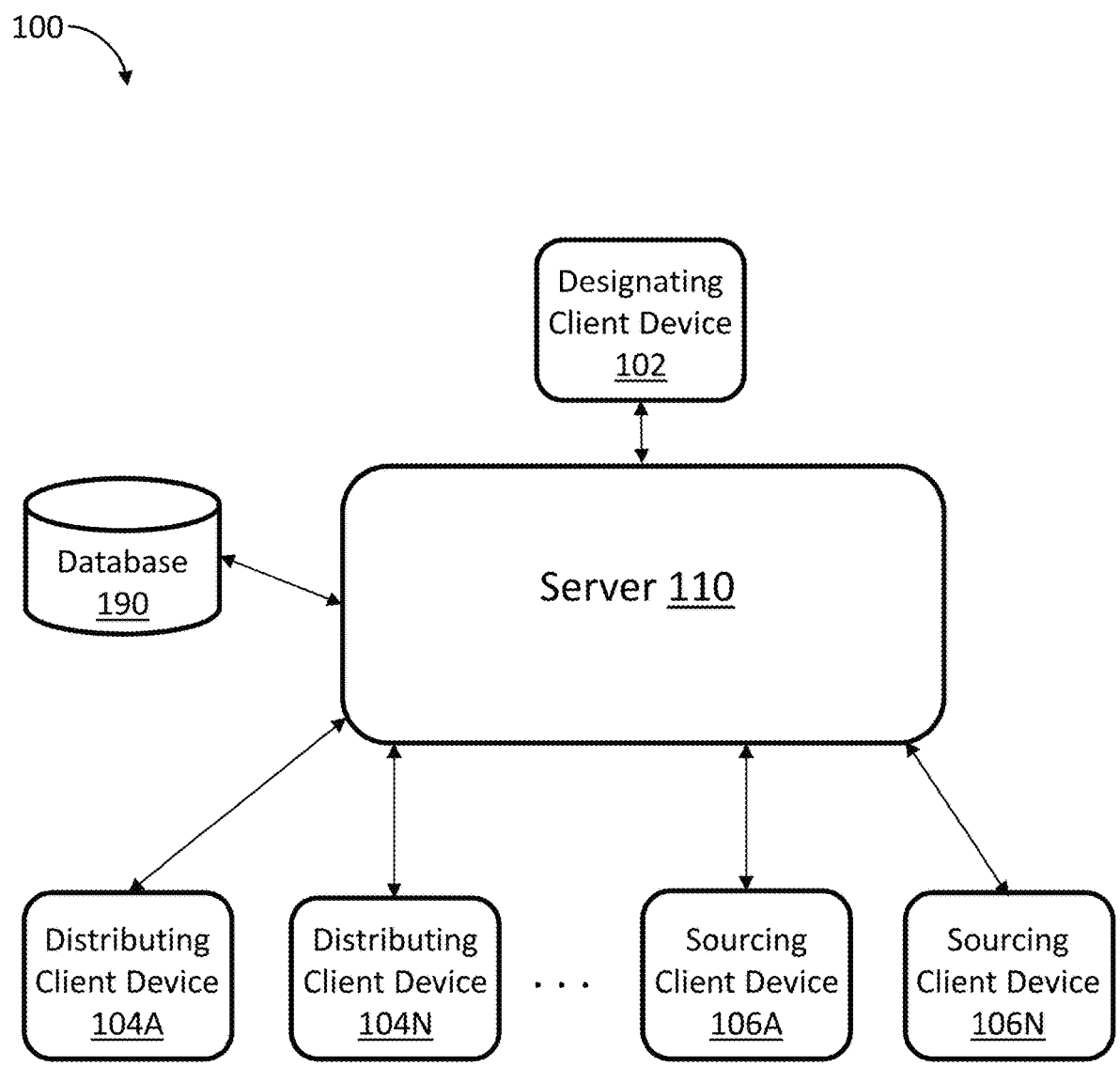
FIG. 1 is a block diagram illustrating a system architecture in which implementations of the current subject matter may be employed.

Like labels are used to refer to same or similar items in the drawings.

DETAILED DESCRIPTION

Aspects of the current subject matter are directed to implementing distributed sourcing in an electronic procurement ("e-procurement") system. In particular, implementations of the current subject matter provide for creating a first group of client devices that are responsible for distributing portions of a transaction, such as one or more items of a transaction, to a second group of client devices for sourcing of the portions of the transaction. Implementations of the current subject matter further relate to automatic assignment of transaction items among the first group of client devices, and to providing an aggregate view of information related to the automatic assignment of the transaction items to allow a designating client device to manage the transaction items.

Aspects of the current subject matter may be employed in an e-procurement system in which client devices are connected to facilitate transactions among each other. For example, in an e-procurement system, client devices may connect to submit and fulfill transactions. A client device wishing to purchase one or more products, items, or services may interface with one or more other client devices to find one or more sources for the one or more products, items, or services. Consistent with implementations of the current subject matter, the client device initiating the transaction (e.g., the designating client device) may wish to efficiently and effectively distribute sourcing tasks among a group of client devices while still remaining in control and having oversight of the overall transaction.

In an e-procurement system in which client devices connect and collaborate on transactions, two actors are typically involved in a transaction: a client device associated with a buyer and a client device associated with a supplier. For example, a client device associated with a buyer may exist for each category or region. However, a single and direct buyer and supplier relationship does not allow for a scenario of distributing bids among strategic buyers in, for example, an aggregated bid and award system.

According to aspects of the current subject matter, distributed sourcing of a transaction in an e-procurement system is implemented based on co-sourcing in which a designating client device enables distributing client devices to participate in a transaction among sourcing client devices (also referred to herein as second client devices). The designating client device, the distributing client devices, and the sourcing client devices may each interact with one another via the e-procurement system through the respective computing devices that connect to the e-procurement system. The e-procurement system further provides for display of graphical user interfaces for the interactions, as further described herein.

According to aspects of the current subject matter, the designating client device may create an event through the appropriate interface, such as a graphical user interface. The event may indicate the parameters and details related a particular transaction, and the event may indicate multiple aspects or portions of the transactions, such as a plurality of items that are needed to satisfy and that together make up the transaction. The purpose of the event, consistent with implementations of the current subject matter, may be to establish criteria relating to the transaction and to form a network or group of distributing client devices to assist in the fulfillment or sourcing of the transaction. Consistent with implementations of the current subject matter, a purpose of a distributing client device is to fulfill one or more portions of the transaction, such as finding one or more sourcing client devices capable of sourcing or providing the one or more portions of the transaction. The transactions are described herein as including one or more items, where items may include products, services, and/or the like. The items including products, services, and/or the like are not limited to a particular type or sector, and rather may be any product and/or service in, for example, the e-commerce, telecommunications, retail, public, and/or private sectors.

The distributing client device may be associated with or have inherent properties. For example, the distributing client device may be associated with a particular geographical region from which they are based or serve, one or more sourcing client devices from whom they have previously sourced or otherwise interacted with, and/or items or types of items which they have previously procured. Consistent with implementations of the current subject matter, the distributing client device may have one or more relationships with one or more sourcing client devices, for example, sourcing client devices from the particular geographical region associated with the distributing client device. In some implementations, the one or more relationships may be based on the distributing client device having secured a transaction or a portion of a transaction with the one or more sourcing client devices. A relationship between the distributing client device and a sourcing client device may be based on the sourcing client device being located in the geographical region associated with the distributing client device and/or a transaction or a portion of a transaction being fulfilled between the distributing client device and the sourcing client device.

Consistent with implementations of the current subject matter and with respect to the items, the designating client device may indicate or otherwise establish constrains related to an association between the sourcing client devices and the items. For example, the constraints may relate to procurement of the items of a transaction. The constraints may define criteria deemed necessary by the designating client device for procuring the items of the transaction, as indicated in the event. For example, the designating client device may indicate that the items or a subset of the items are required to be procured from a particular region, that the items or a subset of the items may be procured from any region, and/or that the items or a subset of the items should be procured from sourcing client devices that have previously transacted with the designating client device or one or more distributing client devices (such sourcing client devices are referred to herein as incumbent suppliers). According to aspects of the current subject matter, the designating client device may select one or more constraints per transaction. For example, for a particular item of the transaction, the designating client device may want the item to be sourced from a particular region. For another item, the designating client device may want to award incumbent suppliers with return business. For additional items, the designating client device may not wish to put any particular constraints on the sourcing of the additional items but may wish to obtain the best (e.g., lowest) price for the additional items.

Aspects of the current subject matter provide for the indication or selection of constraints resulting in the items being assigned to distributing client devices. The assignment of the items to the distributing client devices, according to aspects of the current subject matter, is based on the indicated or selected constraint and/or the inherent properties of the distributing client devices. In particular, the assignment of the items to the distributing client devices may be determined by matching the indicated or selected constraint with the inherent properties of the distributing client devices.

Consistent with implementations of the current subject matter, an item may be assigned to a subset of the distributing client devices. The distributing client devices to which the item is assigned may receive a notification or a request, via a graphical user interface. Each distributing client device to which the item is assigned may respond to the item assignment by inviting one or more of the distributing client device's sourcing client devices to initiate or submit a proposal or bid to be awarded the sourcing of the item. For example, a subset of the sourcing client devices in the distributing client device's network may receive an invitation to submit a proposal or bid to source the item.

For items in which the constraint of procuring items from a particular region is selected, the items may be automatically assigned to distributing client devices in the indicated region. According to aspects of the current subject matter, for the constraint of procuring items from a particular region, the distributing client devices are identified from the inherent properties that indicate the particular geographical region from which they are based or serve.

In some implementations, the designating client device-selected constraint may indicate that the items or a subset of the items may be procured from any region. According to aspects of the current subject matter, an algorithm is applied to determine the assignment of items to distributing client devices that will result in the best (e.g., least) price for the items. For example, for a particular item, a trained machine learning model is applied to identify the assignment of the item to the distributing client devices which are able to secure the best price for the item. According to some implementations, the trained machine learning model may be a forecasting algorithm that runs on historic prices that have been received for different items per geographic region and maintained in a database. The geographic region with the best forecast is the region to which the item is allocated, and the distributing client devices in the geographic region are assigned to the item. The forecasting algorithm may be, for example, a Seasonal Autoregressive Integrated Moving-Average (SARIMA) that is used on time series data of historic prices to make accurate season and/or region based predictions. In some implementations, a clustering algorithm that determines similar items and groups together the similar items may be utilized. For example, the clustering algorithm may use K-means clustering based on item properties, such as item name, category, and/or region, to group together similar items. The group of similar items are inputted into the machine learning model to identify the distributing client devices, based on the geographic region based predictions, for each group of items.

In some implementations, the designating client device-selected constraint may indicate that the items or a subset of the items may be procured from incumbent suppliers, defined herein as those sourcing client devices that have previously transacted with or sourced items to the designating client device or one or more distributing client devices. According to aspects of the current subject matter, a determination is made as to the distributing client devices that have dealt with incumbent suppliers to which an award has been given. For example, a probability-based classification may be used to predict the distributing client devices that have a likelihood of securing a sourcing client device that will be awarded the sourcing of the items or the subset of the items. For example, a Bayes classifier may be used for this purpose. Input features to the classifier may include distributing client device identifier, sourcing client device identifier, bid identifier, and/or item identifier, and the output indicates if an award was given. Sourcing client devices awarded the maximum or most number of items in the set are selected up to, for example, a predetermined number of sourcing client devices. The corresponding distributing client devices may then be determined based on the inherent properties of the distributing client devices. For example, the distributing client devices are determined based on those having relationships with the sourcing client devices awarded the maximum or most number of items.

FIG. 1 depicts an example of a system 100 in which implementations of the current subject matter may be employed.

The system 100 provides a network connection between a designating client device 102, one or more distributing client devices 104A-N, and one or more sourcing (or second) client devices 106A-N. The designating client device 102, the one or more v 104A-N, and the one or more sourcing client devices 106A-N may include or otherwise be associated with one or more client user equipment, such as a computer, a smart phone, a tablet, an Internet of Things (IoT) device, and/or other devices (e.g., processor and memory-based devices). The user equipment may include a user interface, such as a browser or other application to enable access to one or more applications, database layer(s), and/or databases, such as a database 190.

The server 110 may provide the e-procurement system in which client devices connect and collaborate on transactions, according to aspects of the current subject matter. For example, the server 110 may generate a series of graphical user interfaces to enable the transactions between the client devices. The server 110 may implement the operations to provide the sourcing distribution scenario consistent with implementations of the current subject matter described herein.

The communication between the designating client device 102, the one or more distributing client devices 104A-N, and the one or more sourcing client devices 106A-N and the server 110 may be via a connection, such as a wired and/or wireless connection (e.g., the Internet, cellular links, WiFi links, and/or the like). The server 110 may access data from the database 190. In some implementations, a database is associated with one or more of the user equipment.

The server 110 is one example of an engine (e.g., a cloud server or cloud provider or cloud service provider) that may be utilized for the e-procurement system consistent with implementations of the current subject matter.

FIG. 2 is a representation of a graphical user interface 200 for defining a group consistent with implementations of the current subject matter. Consistent with implementations of the current subject matter, an application programming interface (API) is provided to enable the designating client device to add distributing client devices, thereby forming a network or group of distributing client devices. The API may be used to set permissions on one or more items. For example, the designating client device may wish to edit an item and/or sourcing client devices associated with the item. The graphical user interface 200 allows for the forming of the network or group of distributing client devices, and for sourcing an event with multiple items and multiple team members. The designating client device may provide a title for the network or group of distributing client devices, and may also indicate the members (e.g., the distributing client devices), the roles, and/or the project.

FIG. 3 is a representation of a graphical user interface 300 for editing a transaction, defined by an event and including one or more items, consistent with implementations of the current subject matter. The graphical user interface 300 provides for creating a new network or group of distributing client devices with permissions to edit the content of the event that defines the transaction. For example, the designating client device may indicate if the content is visible to the distributing client devices, and may also indicate team access control values, additional editor groups, a subject matter key performance indicator name, and visibility conditions. As an example, a category manager for a particular commodity, such as food, may have better subject matter information about food procurement, and thus the designating client device may incorporate or indicate appropriate selections such as the subject matter key performance indicator name.

The graphical user interfaces 200 and 300 are exemplary user interfaces that may be provided, according to aspects of the current subject matter, for the designating client device to create an event for a particular transaction and to indicate or otherwise define the parameters and details related to the transaction, such as the items and the distributing client devices that are selected to be involved in the gathering of sourcing client devices to source the items. Variations of the graphical user interfaces 200 and 300 are possible consistent with implementations of the current subject matter.

Figure 4:
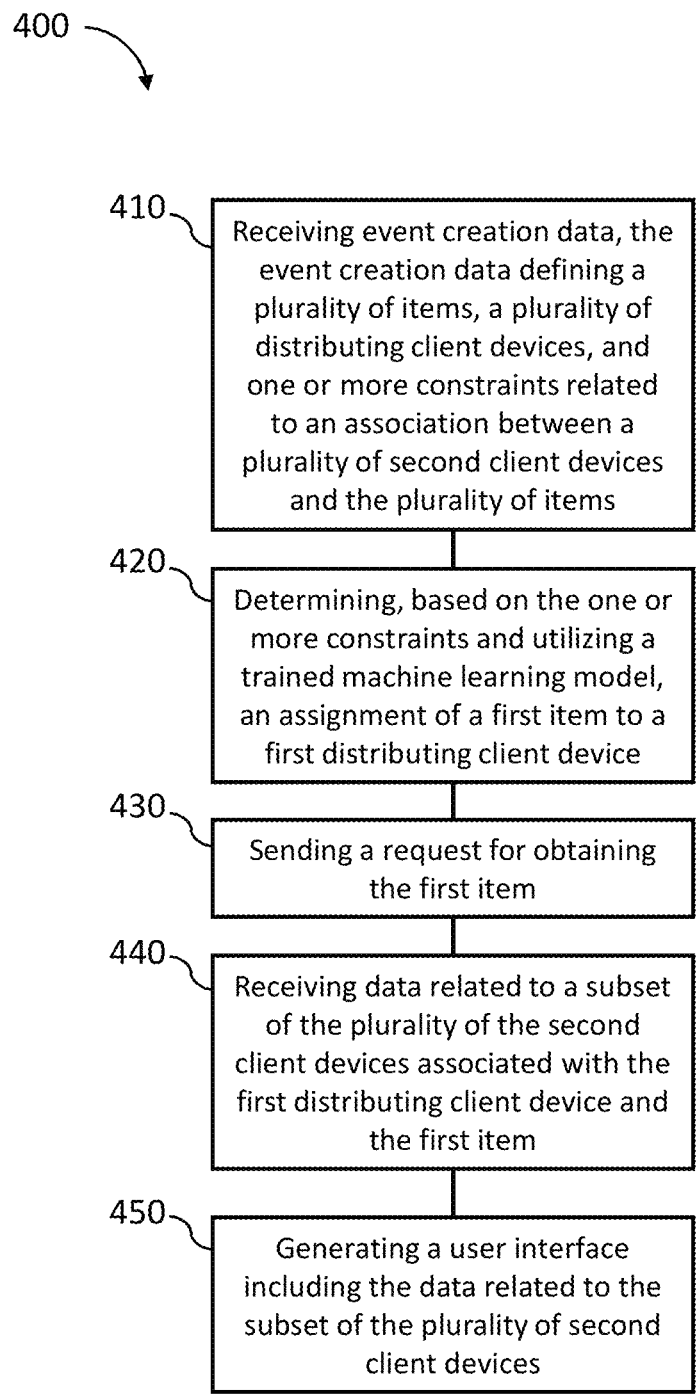
FIG. 4 depicts a flowchart illustrating a process consistent with implementations of the current subject matter.

FIG. 4 depicts a flowchart 400 illustrating a process consistent with implementations of the current subject matter. The process depicted by the flowchart 400 implements the sourcing distribution network consistent with implementations of the current subject matter.

At 410, event creation data is received. For example, the designating client device 102 may provide, via entry of data at a graphical user interface, to the server 110 event creation data. The event creation data may include transaction details for an event. The event creation data may define a plurality of items, a plurality of distributing client devices 104, and one or more constraints. The one or more constraints may relate to an association between a plurality of second client devices and the plurality of items. For example, the one or more constraints may relate to procurement, from a plurality of second client devices (such as the sourcing client devices 106), of the plurality of items. The plurality of distributing client devices 104 may be defined such that the distributing client devices 104 form a network or group of distributing client devices 104 selected by the designating client device 102 to obtain sourcing information related to the items from one or more second client devices associated with the distributing client devices 104. The one or more constraints may indicate that the items or a subset of the items are required to be procured from a particular region, that the items or a subset of the items may be procured from any region, and/or that the items or a subset of the items should be procured from second client devices that have previously transacted with the designating client device or one or more distributing client devices. According to aspects of the current subject matter, the designating client device 102 may select one or more constraints per transaction. The one or more constraints may define an algorithm, such as trained machine learning model, to be used (e.g., by the server 110) for selecting the distributing client devices 104 and/or the second client devices, as further described herein.

At 420, a determination is made as to an assignment of a first item to a first distributing client device 104. The determination of the assignment may be based on the one or more constraints. For example, the designating client device 102 may indicate that the items or a subset of the items are required to be procured from a particular region, that the items or a subset of the items may be procured from any region (e.g., an undefined region), and/or that the items or a subset of the items should be procured from second client devices (such as the sourcing client devices 106) that have previously transacted with the designating client device 102 or one or more distributing client devices 104 (where such second client devices may be referred to herein as incumbent suppliers). Based on the indicated constraint, the corresponding and appropriate algorithm, according to aspects of the current subject matter, may be selected to accordingly select the first distributing client device 104 and/or the second client devices associated with the first distributing client device 104.

At 430, upon determination of the assignment of the first item to the first distributing client device 104, a request is sent to the first distributing client device 104, the request providing an indication to obtain the first item. For example, the first distributing client device 104 is notified of the first item and the need or request to obtain sourcing information from one or more second client devices (such as the sourcing client devices 106) associated with or having a relationship with the distributing client device 104. The distributing client device 104 may then communicate the relevant details to the one or more second client devices and obtain the relevant sourcing information for the first item. The relevant sourcing information may include, for example, pricing details, quantity, availability, timing, and the like.

At 440, data related to a subset of the plurality of second client devices (such as the sourcing client devices 106) is received from the first distributing client device 104. For example, as the first distributing client device 104 obtained relevant sourcing information for the first item from the subset of the plurality of second client devices, the relevant sourcing information is provided such that it may be aggregated and displayed with data from other distributing client devices 104 for viewing and managing by the designating client device 102.

At 450, a user interface is generated and includes the data related to the subset of the plurality of second client devices. For example, the data is populated in a graphical user interface that allows the designating client device 102 to review the data and to enable the designating client device 102 to proceed with awarding a contract to a selected one of the plurality of second client devices. Consistent with implementations of the current subject matter, the first item may be assigned to more than one distributing client devices 104 (e.g., a second distributing client device 104) such that the second distributing client device 104 also obtains relevant sourcing information for the first item. The data from each of the relevant (e.g., assigned) distributing client devices 104 is then, according to implementations of the current subject matter, provided to the designating client device 102 to enable the designating client device 102 to make an informed sourcing decision for the first item. Such data is also provided for each of the items that are defined in the transaction. As the constraints related to the procurement of the items is defined, the items are assigned to one or more distributing client devices 104, each then communicating with their network of second client devices to provide sourcing information to the designating client device 102.

According to aspects of the current subject matter, a designating client device 102 is able to form a network or group of distributing client devices 104 as a sourcing distribution scenario in an e-procurement system. In particular, the designating client device 102 is able to create a network or group of distributing client devices 104 for transactions among and with sourcing client devices 106. Implementations of the current subject matter provide for automatic assignment of transaction items among the network of distributing client devices 104, the assignment based on designating client device-established constraints related to procurement of the items. The designating client device-established constraints allow for the designating client device 102 to define criteria deemed necessary by the designating client device 102 for procuring the items of the transaction. The sourcing distribution scenario according to aspects of the current subject matter ensures privacy of each of the distributing client devices 104, as each distributing client device 104 accesses sourcing client devices 106 without sharing that information with the other distributing client devices 104. The privacy also contributes to the designating client device 102 being provided with competitive sourcing options from the distributing client devices 104, as the distributing client devices 104 are not aware of the sourcing options being provided by the other distributing client devices 104. The aggregated view provided to the designating client device 102 allows for the designating client device 102 to review all of the sourcing options for each item in the transaction and to award the distributing client devices 104 and sourcing client devices 106 as desired. Data related to selected sourcing client devices 106, corresponding items, and corresponding distributing client devices 104 are stored in a database and used as input for subsequent assignments.

Figure 5:
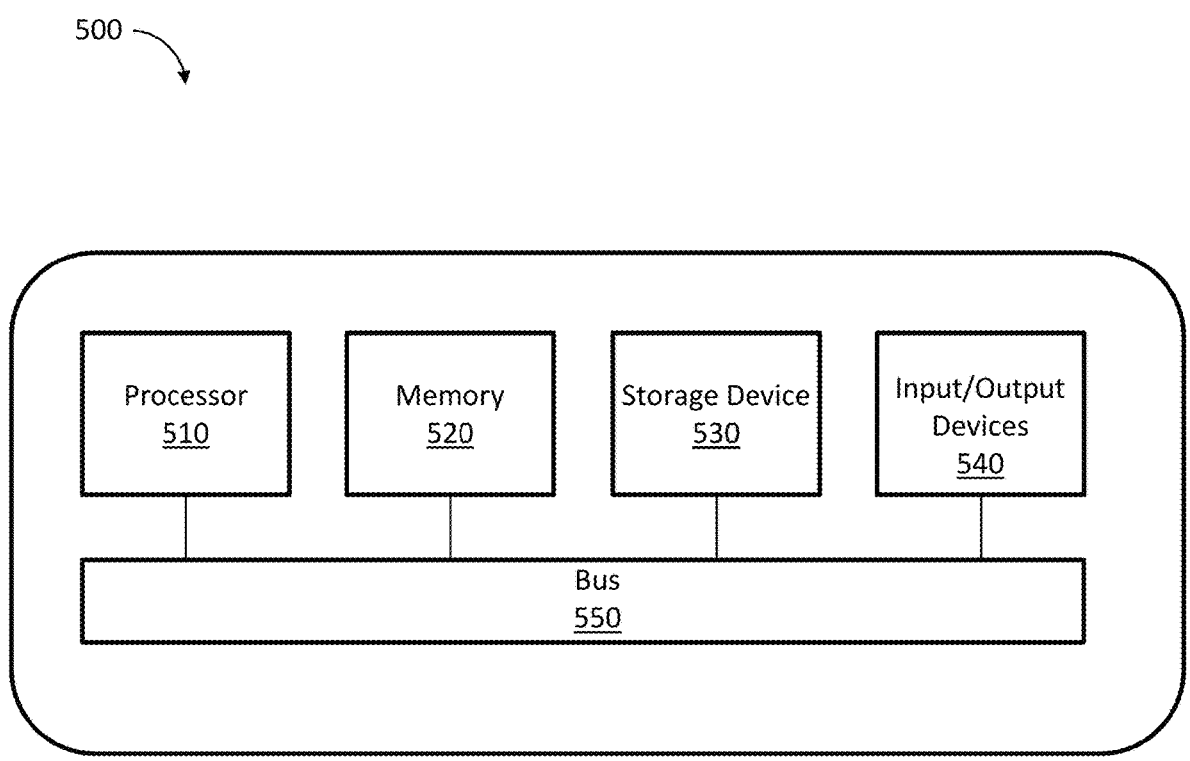
FIG. 5 depicts a block diagram illustrating a computing system consistent with implementations of the current subject matter.

FIG. 5 depicts a block diagram illustrating a computing system 500 consistent with implementations of the current subject matter. Referring to FIG. 1, the computing system 500 can be used to implement the system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the system 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
      receiving, from a designating client device, event creation data defining a plurality of items, a plurality of distributing client devices, and one or more constraints related to an association between a plurality of second client devices and the plurality of items;
      determining, based on the one or more constraints and utilizing a trained machine learning model, an assignment of a first item of the plurality of items to a first distributing client device of the plurality of distributing client devices, wherein the one or more constraints comprise use of a previously-used second client device from the plurality of second client devices, wherein the trained machine learning model predicts likelihood of the plurality of distributing client devices being associated with one or more previously awarded second client devices of the plurality of second client devices;
      sending, to the first distributing client device and in response to determining the assignment, a request to obtain the first item;
      receiving, from the first distributing client device and in response to the request, data related to a subset of the plurality of second client devices, the subset of the plurality of second client devices associated with the first distributing client device and the first item; and
      generating, on a display at the designating client device, a user interface comprising the data related to the subset of the plurality of second client devices.

2. The system of claim 1, wherein the determining is further based on one or more properties associated with the plurality of distributing client devices.

3. The system of claim 1, wherein the trained machine learning model comprises a classification algorithm, wherein input features to the classification algorithm comprise a distributing client device identifier, a second client device identifier, a bid identifier, and/or an item identifier.

4. The system of claim 1, wherein the at least one memory storing instructions, when executed by the at least one data processor, result in further operations comprising:
   determining, based on the one or more constraints and utilizing a trained machine learning model, a second assignment of the first item of the plurality of items to a second distributing client device of the plurality of distributing client devices,
   wherein the user interface comprises second data related to a second subset of the plurality of second client devices, the second subset of the plurality of second client devices associated with the second distributing client device and the first item.

5. The system of claim 4, wherein the at least one memory storing instructions, when executed by the at least one data processor, result in further operations comprising:
aggregating, on the user interface, data related to the plurality of items.

6. The system of claim 1, wherein the at least one memory storing instructions, when executed by the at least one data processor, result in further operations comprising:
providing an application programming interface configured to allow the designating client device to input the event creation data.

7. A computer-implemented method, comprising:
receiving, from a designating client device, event creation data defining a plurality of items, a plurality of distributing client devices, and one or more constraints related to an association between a plurality of second client devices and the plurality of items;
determining, based on the one or more constraints and utilizing a trained machine learning model, an assignment of a first item of the plurality of items to a first distributing client device of the plurality of distributing client devices, wherein the one or more constraints comprise use of a previously-used second client device from the plurality of second client devices, wherein the trained machine learning model predicts likelihood of the plurality of distributing client devices being associated with one or more previously awarded second client devices of the plurality of second client devices;
sending, to the first distributing client device and in response to determining the assignment, a request to obtain the first item;
receiving, from the first distributing client device and in response to the request, data related to a subset of the plurality of second client devices, the subset of the plurality of second client devices associated with the first distributing client device and the first item; and
generating, on a display at the designating client device, a user interface comprising the data related to the subset of the plurality of second client devices.

8. The method of claim 7, wherein the determining is further based on one or more properties associated with the plurality of distributing client devices.

9. The method of claim 7, wherein the trained machine learning model comprises a classification algorithm, wherein input features to the classification algorithm comprise a distributing client device identifier, a second client device identifier, a bid identifier, and/or an item identifier.

10. The method of claim 7, further comprising:
determining, based on the one or more constraints and utilizing a trained machine learning model, a second assignment of the first item of the plurality of items to a second distributing client device of the plurality of distributing client devices,
wherein the user interface comprises second data related to a second subset of the plurality of second client devices, the second subset of the plurality of second client devices associated with the second distributing client device and the first item.

11. The method of claim 10, further comprising:
aggregating, on the user interface, data related to the plurality of items.

12. The method of claim 7, further comprising:
providing an application programming interface configured to allow the designating client device to input the event creation data.

13. A non-transitory computer-readable storage medium including program code, which when executed by at least one data processor, causes operations comprising:
receiving, from a designating client device, event creation data defining a plurality of items, a plurality of distributing client devices, and one or more constraints related to an association between a plurality of second client devices and the plurality of items;
determining, based on the one or more constraints and utilizing a trained machine learning model, an assignment of a first item of the plurality of items to a first distributing client device of the plurality of distributing client devices, wherein the one or more constraints comprise use of a previously-used second client device from the plurality of second client devices, wherein the trained machine learning model predicts likelihood of the plurality of distributing client devices being associated with one or more previously awarded second client devices of the plurality of second client devices;
sending, to the first distributing client device and in response to determining the assignment, a request to obtain the first item;
receiving, from the first distributing client device and in response to the request, data related to a subset of the plurality of second client devices, the subset of the plurality of second client devices associated with the first distributing client device and the first item; and
generating, on a display at the designating client device, a user interface comprising the data related to the subset of the plurality of second client devices.

14. The non-transitory computer-readable storage medium of claim 13, wherein the determining is further based on one or more properties associated with the plurality of distributing client devices.

15. The non-transitory computer-readable storage medium of claim 13, wherein the trained machine learning model comprises a classification algorithm, wherein input features to the classification algorithm comprise a distributing client device identifier, a second client device identifier, a bid identifier, and/or an item identifier.

16. The non-transitory computer-readable storage medium of claim 13, the operations further comprising:
determining, based on the one or more constraints and utilizing a trained machine learning model, a second assignment of the first item of the plurality of items to a second distributing client device of the plurality of distributing client devices,
wherein the user interface comprises second data related to a second subset of the plurality of second client devices, the second subset of the plurality of second client devices associated with the second distributing client device and the first item.

17. The non-transitory computer-readable storage medium of claim 16, the operations further comprising:
aggregating, on the user interface, data related to the plurality of items.

* * * * *